US012021814B2

(12) United States Patent
Lawrence et al.

(10) Patent No.: US 12,021,814 B2
(45) Date of Patent: Jun. 25, 2024

(54) SUPPRESSING MESSAGE NOTIFICATIONS

(71) Applicant: International Business Machines Corporation, Armonk, NY (US)

(72) Inventors: Mark James Lawrence, Eastleigh (GB); Christopher John Swales, Southampton (GB); Aaron James Collins, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 17/811,928

(22) Filed: Jul. 12, 2022

(65) Prior Publication Data

US 2024/0022533 A1 Jan. 18, 2024

(51) Int. Cl.
*H04L 51/224* (2022.01)
*H04L 51/214* (2022.01)
*H04L 51/222* (2022.01)
*H04L 51/226* (2022.01)
*H04M 3/533* (2006.01)
*H04W 68/00* (2009.01)

(52) U.S. Cl.
CPC .......... *H04L 51/224* (2022.05); *H04L 51/214* (2022.05); *H04L 51/222* (2022.05); *H04L 51/226* (2022.05); *H04W 68/00* (2013.01); *H04M 3/53375* (2013.01)

(58) Field of Classification Search
CPC ... H04L 67/535; H04L 51/226; H04L 51/214; H04L 51/222; H04L 51/224; H04L 51/00; H04L 47/6275; H04L 12/18; H04L 65/611; H04W 4/12; H04W 4/02; H04W 4/023; H04W 4/80; H04W 12/63; H04W 68/00; H04W 8/005; H04M 1/72436; H04M 1/72484; H04M 3/5335; H04M 3/53375; H04M 1/724095
See application file for complete search history.

(56) References Cited

U.S. PATENT DOCUMENTS

| | | | |
|---|---|---|---|
| 9,349,120 B2 | 5/2016 | Kalu | |
| 9,473,428 B1 | 10/2016 | Koum | |
| 9,560,208 B2 | 1/2017 | Krack | |
| 9,930,481 B2 | 3/2018 | Kaplan | |
| 10,091,154 B2 * | 10/2018 | Chakra | H04L 51/224 |
| 10,149,278 B2 * | 12/2018 | Borges | H04W 48/16 |
| 10,681,209 B2 * | 6/2020 | Hassan | H04M 19/04 |
| 11,343,335 B2 * | 5/2022 | Cary | H04L 67/565 |

(Continued)

OTHER PUBLICATIONS

An IP.com Prior Art Database Technical Disclosure Authors et. al.: Disclosed Anonymously "Reduce Alert Annoyance" IP.com No. IPCOM000224895D IP.com Electronic Publication Date: Jan. 9, 2013, pp. 1-3 (Year: 2013).*

(Continued)

*Primary Examiner* — Rachel J Hackenberg
(74) *Attorney, Agent, or Firm* — Randy Tejeda

(57) ABSTRACT

One or more computer processors receive a message, with a message device, from a server, wherein the message device and at least one other nearby message device belong to a shared chat group. The one or more computer processors, responsive to determining that the at least one other nearby message device has received and emitted a notification associated with the message, suppress the notification associated with the message.

20 Claims, 8 Drawing Sheets

(56) References Cited

U.S. PATENT DOCUMENTS

| | | | | |
|---|---|---|---|---|
| 11,588,913 | B1* | 2/2023 | Castro | H04L 67/55 |
| 2013/0339436 | A1* | 12/2013 | Gray | H04L 12/1818 |
| | | | | 709/204 |
| 2016/0164810 | A1 | 6/2016 | Wolz | |
| 2019/0012902 | A1 | 1/2019 | Kumar | |
| 2019/0230623 | A1* | 7/2019 | Okajima | H04W 68/02 |
| 2022/0141637 | A1* | 5/2022 | Pellegrini | H04M 1/72469 |
| | | | | 455/404.1 |

OTHER PUBLICATIONS

"Create P2P connections with Wi-Fi Direct", Last updated Mar. 9, 2022 UTC, 14 pages, <https://developer.android.com/training/connect-devices-wirelessly/wifi-direct>.

"Messages", Downloaded Mar. 24, 2022, 27 pages, <https://developers.facebook.com/docs/whatsapp/api/messages>.

"Platform_development/samples", Downloaded Mar. 24, 2022, 4 pages, <https://github.com/aosp-mirror/platform_development/tree/master/samples>.

"Use Wi-Fi Direct (P2P) for service discovery", Last updated Oct. 27, 2021 UTC, 7 pages, <https://developer.android.com/training/connect-devices-wirelessly/nsd-wi>.

"Wi-Fi Direct—Overview and Features", Downloaded Mar. 24, 2022, 14 pages, <https://hsc.com/DesktopModules/DigArticle/Print.aspx?PortalId=0&ModuleId=1215&Article=221>.

D, Kaushal, "Simplifying Android Development", Sep. 14, 2016, 7 pages, <https://androiddevsimplified.wordpress.com/2016/09/14/wifi-direct-service-discovery-in-android/>.

Dehaye, Paul-Olivier, "Inferring distance from Bluetooth signal strength: a deep dive", May 19, 2020, 19 pages, https://medium.com/personaldata-io/inferring-distance-from-bluetooth-signal-strength-a-deep-dive-fe7badc2bb6d>.

Gordon, Whitson, "How to Deal With Overly Chatty Group Texts", May 30, 2018, 2 pages, <https://www.nytimes.com/2018/05/30/smarter-living/how-to-deal-with-overly-chatty-group-texts.html>.

Santos, Nuno, "WiFi Direct in Android", Mobile and Ubiquitous Computing, MEIC/MERC 2015/2016, 17 pages, <https://www.gsd.inesc-id.pt/%7Ewiki/courses/cmu1516/lab04/slides.pdf>.

Mell et al., "The NIST Definition of Cloud Computing", Recommendations of the National Institute of Standards and Technology, NIST Special Publication 800-145, Sep. 2011, 7 pages.

* cited by examiner

300

| GROUP NAME | MESSAGE ID |
|---|---|
| ... | ... |
| ... | ... |
|  |  |
|  |  |

| GROUP NAME | MESSAGE ID |
|---|---|
| ... | ... |
| ... | ... |
| 302 — ALPHA | X |
|  |  |

| GROUP NAME | MESSAGE ID | FIRST NEARBY DEVICE TO RECEIVE MESSAGE | ORDER TO RECEIVE MESSAGE |
|---|---|---|---|
| ... | ... | ... | ... |
| ... | ... | ... | ... |
| ALPHA | X | RECEIVING CLIENT 1 | 1st |
|  |  |  |  |

402 points to the ALPHA row.

600

| GROUP NAME | MESSAGE ID |
|---|---|
| ... | ... |
| ... | ... |
|  |  |
|  |  |

FIG. 6

SUPPRESSING MESSAGE NOTIFICATIONS

BACKGROUND

The present invention relates generally to the field of messaging, and more particularly to suppressing message notifications for devices in proximity, or nearby to each other.

Messaging is the act of composing and sending electronic messages, typically consisting of alphabetic and numeric characters, between two or more users of mobile devices, desktops/laptops, or another type of compatible computer. Messages may be sent over a cellular network or may also be sent via an Internet connection using the Short Message Service (SMS) and Multimedia Messaging Service (MMS) containing digital images, videos, and sound content. Messages are used for personal, family, business, and social purposes. Governmental and non-governmental organizations use messaging for communication between colleagues.

SUMMARY

Embodiments of the present invention disclose a computer-implemented method, a computer program product, and a system for suppressing message notifications. The computer-implemented method includes one or more computer processors receiving a message, with a message device, from a server, wherein the message device and at least one other nearby message device belong to a shared chat group. The one or more computer processors, responsive to determining that the at least one other nearby message device has received and emitted a notification associated with the message, suppress the notification associated with the message.

BRIEF DESCRIPTION OF THE DRAWINGS

FIGS. 3A and 3B illustrate examples of a local cache of a receiving client;

FIG. 6 illustrates an example of a local cache of a receiving client;

DETAILED DESCRIPTION

Figure 1:
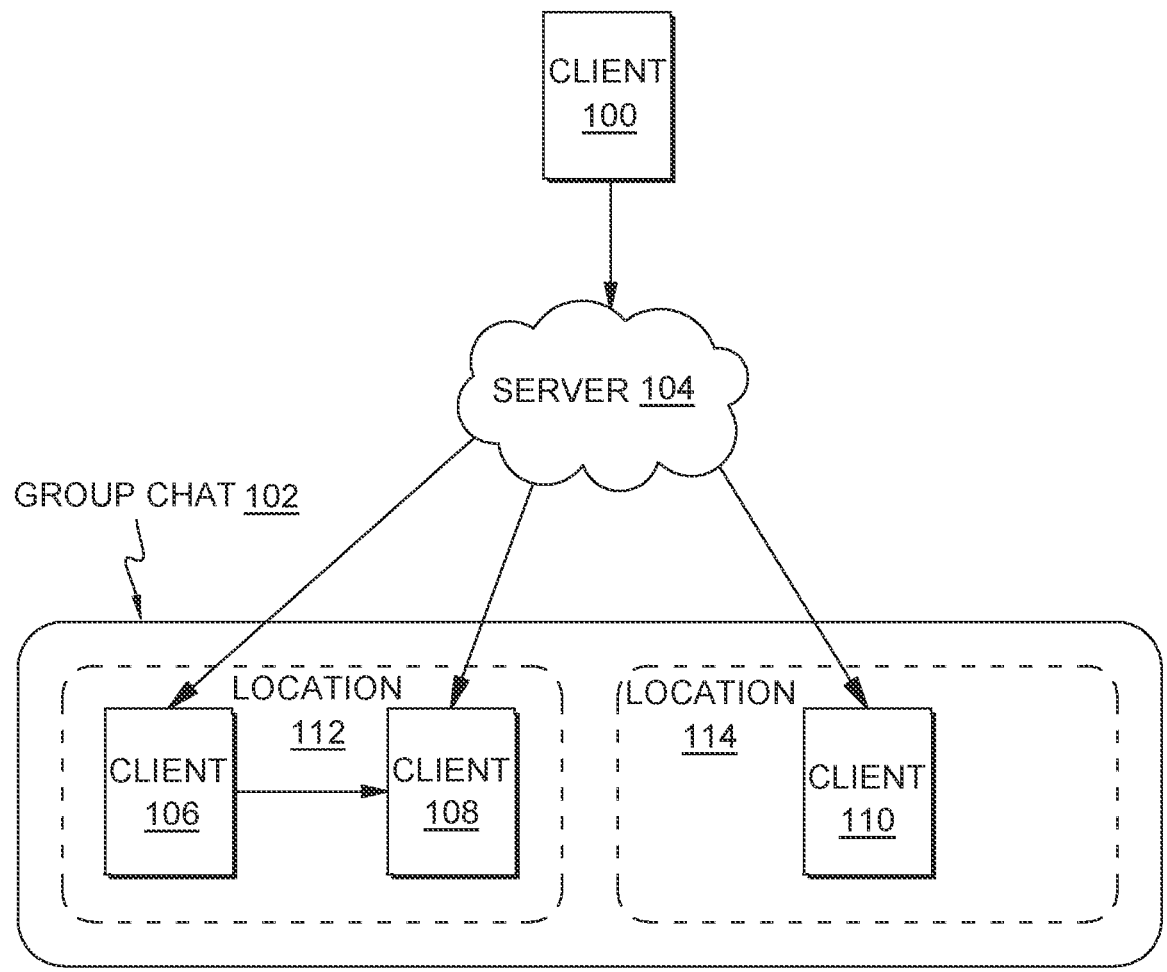
FIG. 1 (i.e., FIG.) is a functional block diagram illustrating an embodiment wherein a message is sent to three receiving clients in two locations.

The use of messaging devices for communication has become universal among customers for business and personal purposes. Messaging devices, such as cell phones, tablets and laptops are used by users to communicate with other users around the globe. A common feature of message platforms is the use of group chats or group channels, where multiple users communicate with each other in one space. One member of the group chat can send out a message to the other members of the group simultaneously.

Each user has their own settings in relation to notifications, where they can set their mobile device to have visual and/or audio notifications, vibrations, or no notifications. A problem arises when multiple users of the same group chat are in the same location as one another. If the audio notification settings are all on for each device in the vicinity, each device will emit a notification when they receive a group message. This is distracting and irksome for the users, especially when there are many messages being sent in succession in the group chat.

Another problem arises since messages are usually sent through a messaging platform, such that messages for one user can be accessed through multiple devices. It is common for a single user to access their messages through their cell phone, laptop, tablet, and smart watch all at the same time. When a message is received by a user, multiple notifications get alerted on multiple devices. This issue is compounded when there are multiple users with multiple devices in the same vicinity.

A feature that is implemented on conventional cell phones is to mute notifications based on the time that has elapsed since the first notification. This solves the issue of getting dozens of audio notifications in a short period of time for one user, but it does not solve the problem of the scenario where there are multiple users in the same group receive the message and multiple audio notifications are set off at the same time.

Another known solution to this problem is to suppress notifications on a device once detected, via its microphone, that another device in its vicinity has emitted a notification. There are several flaws with this solution. First, this method uses the microphone on a messaging device to determine whether it should or should not emit a notification. It relies on having a clear audio stream, without background noise for the method to work. Secondly, this method cannot distinguish between a notification related to a message from a shared group chat, or a notification related to another message received independently by the other device.

Embodiments of the present invention provide a method for suppressing message notifications, the method comprising: receiving, by a message device, a message from a server, wherein the message device and at least one other nearby message device belong to a shared chat group; and responsive to determining that the at least one other nearby message device has received and emitted a notification associated with the message, the message device suppressing the notification associated with the message.

Embodiments of the present invention recognize that the suppression of notifications of nearby message devices reduces excessive auditory noises and vibrational alerts in an area within the auditory range of a human. This results in a less distracting environment for the users of the nearby message devices. The terms "nearby", "in the vicinity of", "in the range of" and "proximate to" are used to describe an area within the auditory range of a human.

Preferably, embodiments of the present invention provide a method, wherein the at least one other nearby device is identified by analyzing message devices within a pre-defined proximity of the message device.

Preferably, embodiments of the present invention provide a method, wherein the at least one other nearby device is identified by a device location method associated with the message device.

Advantageously, identifying the nearby messaging devices results in the suppression of notifications from only the nearby devices related to the message device. The method does not suppress notifications for devices that are outside the auditory range of a human.

Embodiments of the present invention provide a method wherein determining that the at least one other nearby message device has received and emitted a notification associated with the message comprises comparing a unique identifier of the message to a local cache in the message device. Advantageously, the unique identifier of the message allows the suppression of specific message notifications. This means that notifications related to other messages from different applications or different chat groups to not get suppressed by the method.

Embodiments of the present invention provide a method further comprising responsive to determining that the at least one other nearby message device has not received and emitted a notification associated with the message, the message device emitting the notification, wherein the step of emitting the notification is dependent upon a notification setting associated with the message device. Advantageously, depending upon a notification setting means that even if a message device is the first device in the nearby vicinity to receive the message from a server, the at least one other nearby device can emit the notification instead. For example, if the message device is on "silent mode", the next device to receive the message can emit a notification related to the message.

Embodiments of the present invention provide a method further comprising transmitting a data packet to the at least one other nearby device, wherein the data packet comprises a group chat ID and a message ID which are stored in a local cache of the at least one other nearby device.

Advantageously, as a specific message for a specific group chat can be identified using the data packet and the local cache, the method allows the suppression of only the relevant notifications. This contrasts with suppressing a notification based on any nearby device emitting a notification. As the information about the message is sent via the data packet, the message devices do not require microphones to identify that a notification has been emitted in the nearby vicinity. This means that smart devices that can receive messages and emit notifications but do not have microphones, such as wearable devices and tablets, can be used in this system and method.

Embodiments of the present invention provide a method, wherein the data packet further comprises a message device ID, the order the said message device received the message, and the notification settings of said message device. Advantageously, the additional contents of the data packet allow the nearby message device to work with more information regarding the message.

Embodiments of the present invention provide a method, further comprising transmitting a data packet to any nearby device, wherein any such nearby device is proximate to the message device, relative to the message device, capable of receiving the data packet, and wherein the data packet comprises a group chat ID and a message ID. Advantageously, transmitting, or broadcasting the data packet to any nearby message device allows for a reduction of processing time for the message device. This is because the message device does not need to identify which of the nearby message devices belong to the same chat group as the message device, and therefore which nearby message device to send the data packet to. Instead, it is the receiving message device which can use the group chat ID to determine whether it is part of this group chat and therefore whether the message is of relevance.

Embodiments of the present invention provide a method, further comprising analyzing, by the nearby device, the data packet to determine whether the message device and the message device belong to the same chat group and responsive to determining that they do belong to the same group chat, storing the data packet into a local cache of the nearby message device.

Embodiments of the present invention provide a method, wherein the data packet is transmitted via User Datagram Protocol (UDP). Advantageously, UDP allows communication between devices without prior connections or handshakes, allowing the method to both send the data packet to a specific group of message devices, as well as broadcast the data packet to all nearby message devices.

Embodiments of the present invention provide a method, wherein the message device and at least one other nearby message device belong to different users. Advantageously, the method allows the suppression of notifications for a message received by multiple users, such that only one notification is emitted in the same vicinity.

Embodiments of the present invention provide a method, wherein the message device and at least one other nearby message device belongs to the same user. Advantageously, the method works in situations where a user has multiple message devices in the same vicinity that receive the same message from the server.

Embodiments of the present invention provide a computer program product for suppressing message notifications, the computer program product comprising: program instructions to receive, by a message device, a message from a server, wherein the message device and at least one other nearby message device belong to a shared chat group; and program instructions to suppress the notification associated with the message, responsive to determining that the at least one other nearby message device has received and emitted a notification associated with the message.

Embodiments of the present invention provide a system for suppressing message notifications, the system comprising: a processing device; and a memory coupled to the processing device and storing instructions that, when executed by the processing device, cause the system to perform operations comprising: receiving, by a message device, a message from a server, wherein the message device and at least one other nearby message device belong to a shared chat group; and responsive to determining that the at least one other nearby message device has received and emitted a notification associated with the message, the message device suppressing the notification associated with the message. Implementation of embodiments of the invention may take a variety of forms, and exemplary implementation details are discussed subsequently with reference to the Figures.

It should be appreciated that the terms group chat and group channel are seen as synonymous with one another.

The present invention will now be described in detail with reference to the Figures.

FIG. 1 illustrates environment 10 containing an embodiment of the present invention, wherein a sending client 100 sends a message to a group chat 102 via a server 104 to three receiving clients 106, 108, 110. The sending client and receiving clients are all message devices. Receiving client 106 and receiving client 2 108 are in location A 112, nearby each other. Receiving client 100 is in location B 114, away from receiving clients 106 and 2 108.

The sending client 100 transmits a message with an id "X" to the group chat with an id "Alpha" 102 and the server 104 transmits the message to each receiving client 106, 108, 110 in the group chat 102. Although the message is sent out simultaneously by the server, the order in which the message devices receive the same message depends on the individual receiving device's network connection conditions, network speed and processing speed of the messaging device. In this example, receiving client 106 receives the message first.

Each message device comprises a local cache that keeps a record of each group chat and each received message ID.

Figure 2:
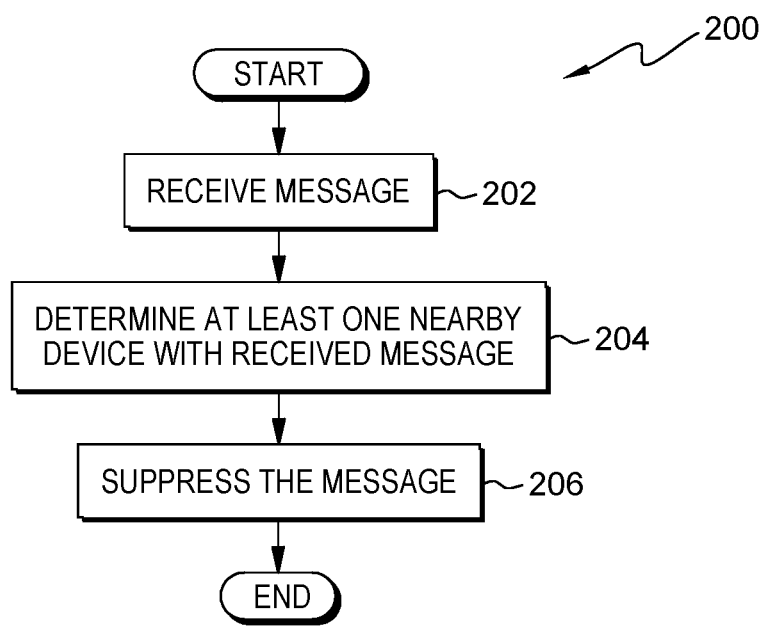
FIG. 2 is a flowchart depicting operational steps of a program for suppressing message notifications, in accordance with an embodiment of the present invention.

FIG. 2 depicts flowchart 200 illustrating operational steps of program 1060 for suppressing message notifications, in accordance with an embodiment of the present invention.

Program 1060 receives a message (step 202). In an embodiment, program 1060 commences in response to a received message or a transmitted message by a mobile device (e.g., cell phone). FIG. 1 further illustrates step 202, particularly the sending client 100 transmits a message with an id "X" to the group chat with an id "Alpha" 102 and the server 104 transmits the message to each receiving client 106, 108, 110 in the group chat 102. Although the message is sent out simultaneously by the server, the order in which the message devices receive the same message depends on the individual receiving device's network connection conditions, network speed and processing speed of the messaging device. In this example, receiving client 106 receives the message first.

Program 1060 determines at least one nearby device with the received message (step 204). Program 1060 determines whether any of the other nearby message devices have received and emitted a notification associated with the message. Receiving client 106 compares the incoming group chat name and the message ID to its local cache. It does not have an entry in the local cache relating to the new incoming message, which means that it is the first device in the nearby location to receive the message "X". Responsively, program 1060 transmits a data packet to each of the nearby message devices. The data packet comprises a group chat ID and a message ID. The data packet and the local cache can also contain further information related to the message, such as the timestamp of when then the message was received, a message device ID, the notification settings of said message device and an indication of whether the message device emitted an audio notification. The transmittal of the data packet can also be done before the audio notification is emitted, or after the notification is emitted. FIGS. 3A and 3B further illustrate the cache comparison and subsequent message determinations.

Figures 4, 5:
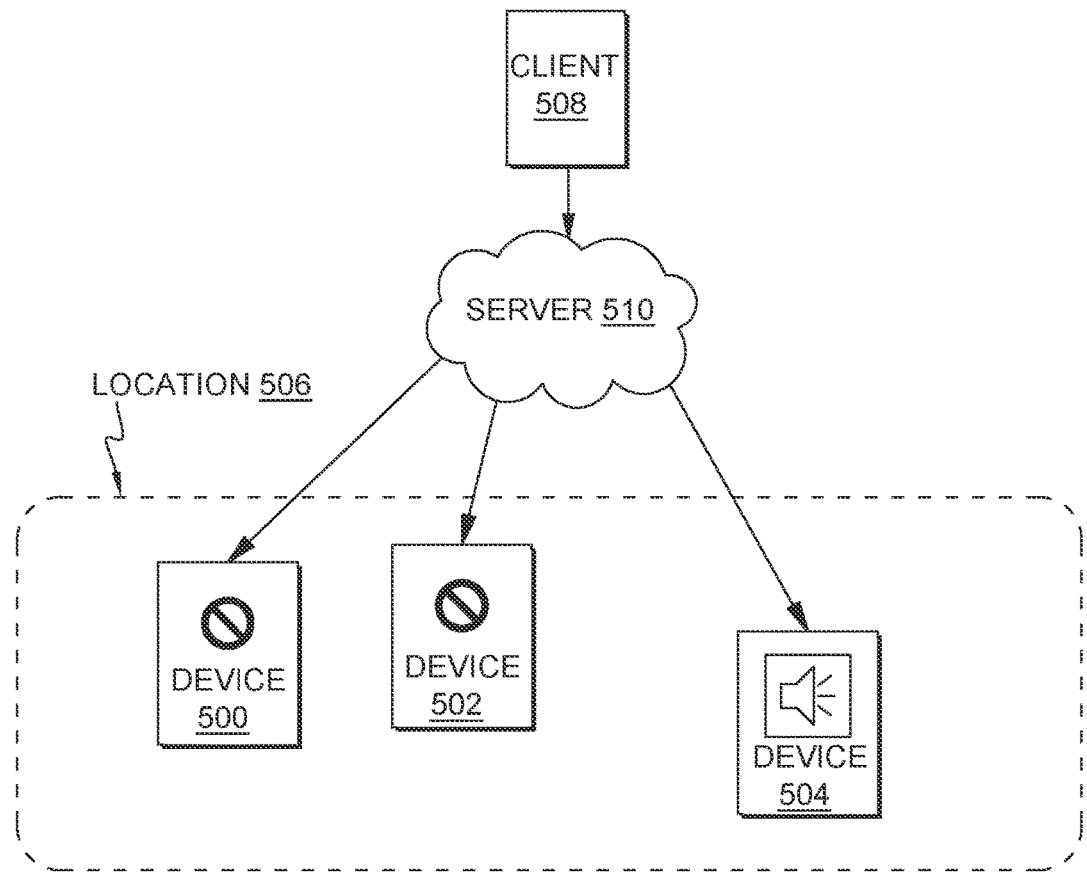
FIG. 4 illustrates an example of a local cache of a receiving client.
FIG. 5 illustrates an embodiment wherein a message is sent to three receiving clients in the same location, wherein two of the receiving clients have their notifications settings turned off.

Program 1060 suppresses the message (step 206). Responsive to program 1060 determining that the received message has already been received by one or more nearby devices, program 1060 suppresses a notification or audio emission associated with the received message on an associated message receiving device. For example, responsive to a received message X, program 1060 compares the group chat name, message ID to the contents of its local cache 300. Since there is an entry related to the message ID, program 1060 deduces that another nearby message device has already emitted a notification related to the message. This will result in only receiving client 106 emitting an audio notification in location A 112 for message X. FIG. 4 further illustrates the message suppression process.

FIG. 3A illustrates an example of the local cache 300 of receiving client 106 in the state before it receives message "X".

Receiving client 106, determines whether any of the other nearby message devices have received and emitted a notification associated with the message. Receiving client 106 compares the incoming group chat name and the message ID to its local cache. It does not have an entry in the local cache relating to the new incoming message, which means that it is the first device in the nearby location to receive the message "X".

FIG. 3B illustrates an example of the local cache 300 after receiving message "X". Receiving client 106 logs the group chat name and the message ID to the local cache to a new row 302. The message is from group chat "Alpha" 304, with a message ID of "X" 306.

As receiving client 106 establishes that it is the first nearby device to receive message X, receiving client therefore emits an audio notification that is associated with message X. The skilled person will appreciate that other notifications can also be suppressed by the present invention. For example, vibrational, camera flashing, and visual notifications can also be suppressed.

In parallel to emitting the audio notification, receiving client 106 transmits a data packet to each of the nearby message devices. The data packet comprises a group chat ID and a message ID. The data packet and the local cache can also contain further information related to the message, such as the timestamp of when then the message was received, a message device ID, the notification settings of said message device and an indication of whether the message device emitted an audio notification. The transmittal of the data packet can also be done before the audio notification is emitted, or after the notification is emitted.

In this example, there is one other message device in the vicinity—receiving client 108. The data packet contains information about the group chat and message ID. FIG. 4 illustrates an example of the local cache 400 of receiving client 108. Receiving client 108 logs the information from the data packet to its own local cache 400, into a new row 402.

When receiving client 108 eventually receives message X, it compares the group chat name, message ID to the contents of its local cache 400. Since there is an entry related to the message ID, it deduces that another nearby message device has already emitted a notification related to the message. This will result in only receiving client 106 emitting an audio notification in location A 112 for message X.

In location B 114, there is only one messaging device that is in group chat "Alpha", receiving client 110. Therefore, when receiving client 3 110 receives the message from the server, it compares the message ID to its local cache. Since there is no record of another messaging device receiving message X first in its local cache, it records the message ID to the local cache and emits an audio notification associated with message X. As there are no other nearby devices in location B, it does not emit a data packet since there are no other nearby devices in location B 114.

The transmission of the data packet must be rapid such that the other nearby receiving devices in the location receives the data packet before they receive the message from the server. Therefore, a reliable and fast communications protocol must be used to transmit the data packet from the receiving device that first receives the message to the other nearby messaging devices in the same location.

One such protocol that can be used to transmit the data packet is via User Datagram Protocol (UDP). UDP is an internet messaging protocol that allows devices to send small packages of data to other devices in a shared network. It is not necessary to first establish a communication channel to be able to transmit data packets between devices. UDP can be used to send a data packet to a specific list of nearby message devices, as well as transmit, or broadcast the data packet to any nearby device that is capable of receiving the data packet. The person skilled in the art will appreciate that other known communications protocols can be used to transmit the data packet between the receiving clients.

In an embodiment, the message device analyses the nearby message devices using known device location methods, such as using the inbuilt short-range wireless connection capabilities. The short-range wireless range is around 10 m and therefore the message device will be able to locate nearby devices within this range. Another known device location method that can be used is the wireless indoor positioning system, which can locate devices within an established wireless network using triangulation and fingerprinting techniques. Wireless positioning systems can triangulate devices within a few meters and up to 100 m of the message device.

In one embodiment, a pre-defined proximity is set by the server or a user; it can be set to allow the invention, in accordance with a preferred embodiment, to work within a room or a space where it is desirable to suppress excess messaging notifications. For example, the pre-defined proximity can be set to an area of 3 m×3 m; an area that would cover a large room. The message device will establish devices that are in the 3 m×3 m area and then analyze whether the other message devices belong to the same group chat. This analysis can be done using group chat ID provided by the server, or information available within the server about the other participants in the group chat. The information about the nearby devices that belong to the same chat group is stored in the memory of each message device.

In an alternative embodiment, instead of analyzing the nearby vicinity and establishing a list of nearby devices, the message device sends out the data packet to all nearby devices in the vicinity. It is then up to the receiving nearby device to determine whether the data packet is relevant for them or not. The receiving message device can compare the group chat ID and the message device ID from the data packet to information it has about the relevant message devices in shared group chats, to determine whether to store the contents of the data packet to its local cache. The receiving message device may request the shared group chat information about other message devices that are in shared group chats from the server.

The preferred embodiment takes each receiving user's prior notification settings into consideration when emitting and suppressing audio notifications. For example, some users prefer to have audio notifications on, whereas some users permanently keep their phone on vibration or silent mode. Some users may dynamically change their notification settings depending on their situation, for example, they may have notifications on at home but turn all audio and vibrational notifications off while in a meeting at work.

Therefore, when the first receiving client in a location receives the message, the invention, in accordance with a preferred embodiment, will check the device's current notification settings. If the audio notification settings are off, the first receiving client will not emit an audio notification and does not transmit a data packet. In this way, the first receiving client device passes on the responsibility of emitting an audio notification to the next receiving client.

FIG. 5 illustrates environment 50 containing an example comprising three receiving devices 500, 502, and 504 in location D 506. A message is sent from a sending client 508, via the server 510 to each of the receiving devices. Receiving client 500 receives the message first and compares the message ID to the data in its local cache. There is no record of the message, therefore it establishes that receiving client 500 is the first message device to receive the message in location D; before receiving client 502 and receiving client 504. Before emitting an audio notification, it checks the notification settings of the device—in this example, receiving client 500 has set its audio notifications to be off. Therefore, receiving client 500 does not emit an audio notification and does not send out a data packet to other nearby devices.

In this example, receiving client 502 receives the message from the server next. It compares the message ID to its local cache and does not find an entry associated with the message. Therefore, if the audio notification settings for receiving client 502 is on, receiving client 502 will emit an audio notification associated with the message. However, in this example, receiving client 502 also set its audio notifications off, and therefore receiving client does not emit an audio notification.

Alternatively, the system can be configured to allow multiple types of notifications. For example, receiving client 502 may have vibrational notifications on and audio notifications off. When it receives the message from the server, it emits the vibrational notification but does not send out a data packet. This in turn, allows other nearby devices to continue to emit a vibrational or audio notification. The person skilled in the art will appreciate that there can be multiple variations of configuration relating to allowing notification types.

Figure 6:
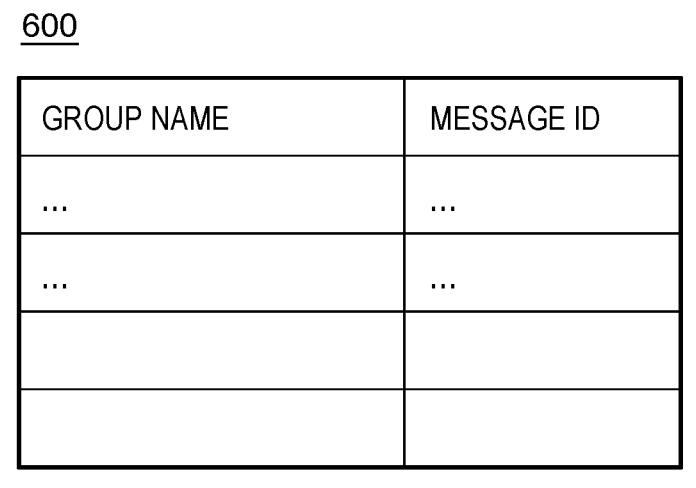

FIG. 6 illustrates an example of the local cache 600 of receiving client 504. When receiving client 504 finally receives the message from the server, it compares the message ID to the entries in its local cache 600. Since the two other receiving clients 500, 502 did not emit a notification and did not transmit a data packet, there are no entries related to message X in the local cache 600. Receiving client 504 checks its own notification settings to find that it can emit audio notifications. Therefore, receiving client 504, even though it was not the first device to receive message X, emits an audio notification associated with message X. If there were other devices in the nearby location, receiving client 504 would emit a data packet to the other devices in the area to indicate that it has emitted a notification associated with message X.

The establishment of a plurality of nearby message devices within a pre-defined proximity to the message device, wherein the message device and the plurality of nearby message devices belong to a chat group can be carried out in the background periodically. Each messaging device belonging to may periodically, e.g., every 1 minute or every 30 minutes, use the known location methods to determine which nearby devices also belong to the same group chat. Alternatively, the establishment or the nearby devices can be carried in response to a message being sent to a group chat.

The person skilled in the art will appreciate that there may multiple users in a location, wherein the users have multiple devices able to receive and emit a notification associated with the same message. For example, a user can have their cell phone on at the same time as using their laptop, wherein the laptop has the messaging platform installed and is therefore another messaging device. When the cell phone or the laptop receives a message from the server, the first device to receive the message processes the method of the preferred embodiment to suppress excess notifications related to the same message.

In another embodiment of the present invention, the first receiving message device transmits the data packet to all devices in the nearby location. The determination of whether the first message device to receive the message and the other message device belong to the same group chat is therefore performed by each of the other devices in the nearby location. The determination is done by comparing the group chat ID in the data packet to a list of group chats the message device belongs to. If the two message devices belong to the same chat group, the message device which receives the data packet will log the information to its local cache and suppress its notifications accordingly. If the two message devices do not belong to the same group chat, the message device which receives the data packet will ignore the received data packet.

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing system", "processing module", "processing circuit", "processor", and/or "processing unit" may be used interchangeably and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be distributed located (e.g., cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

Figure 7:
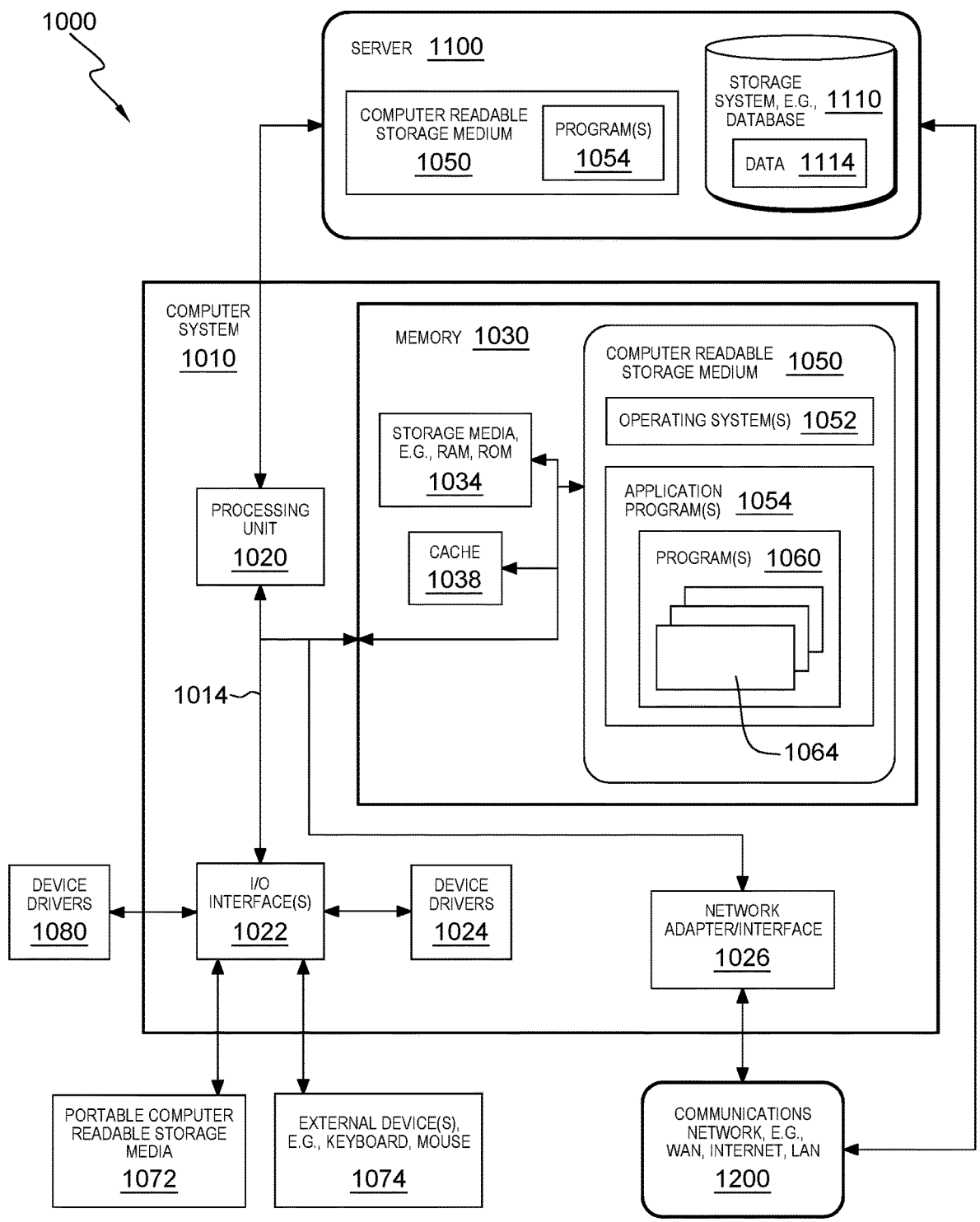
FIG. 7 is a block diagram depicting the hardware components of a system, for operating a gyroscopic haptic navigation device in accordance with an embodiment of the invention.
Figure 8:
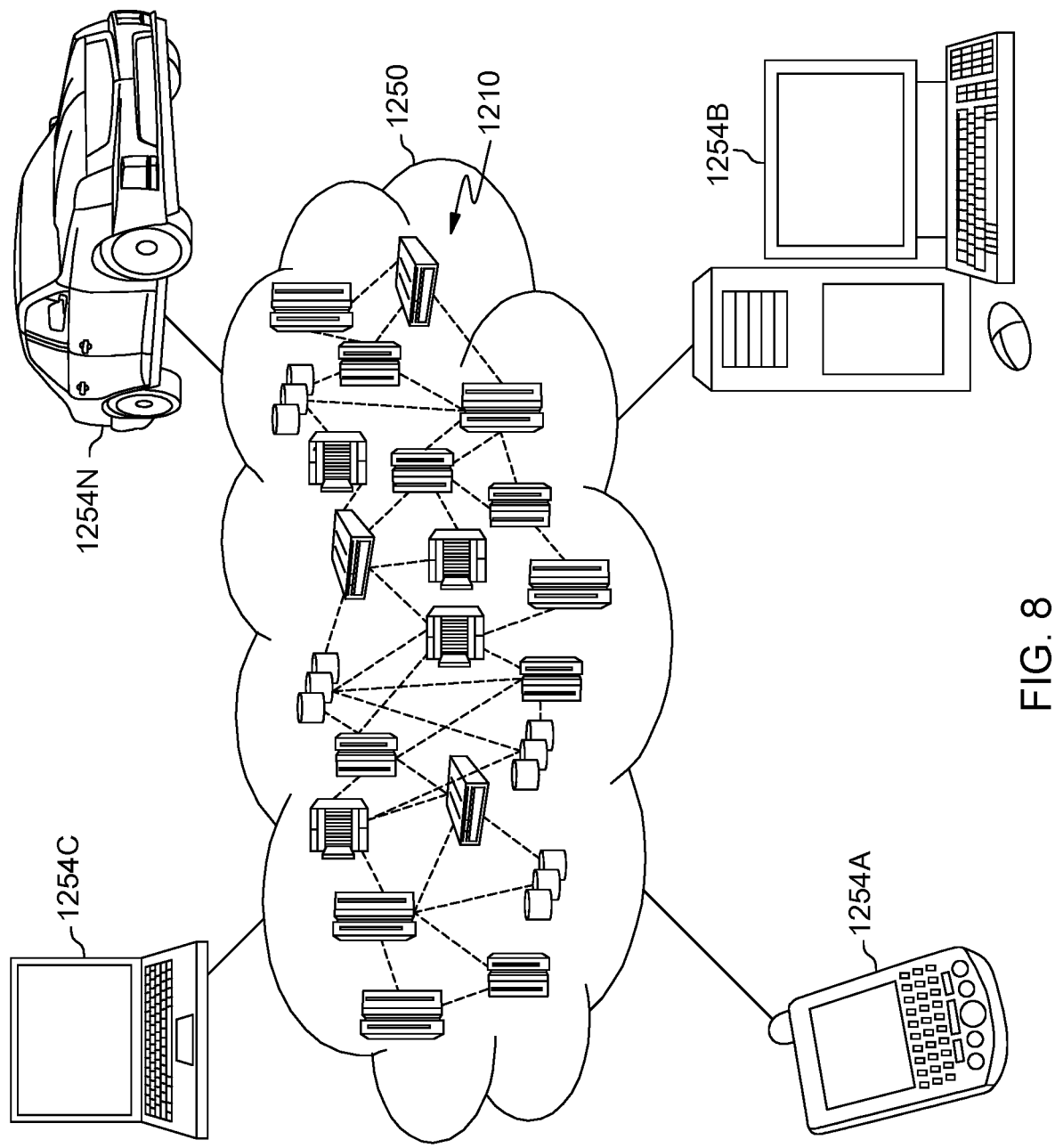
FIG. 8 is a functional block diagram depicting a cloud computing environment, in accordance with an embodiment of the invention.
Figure 9:
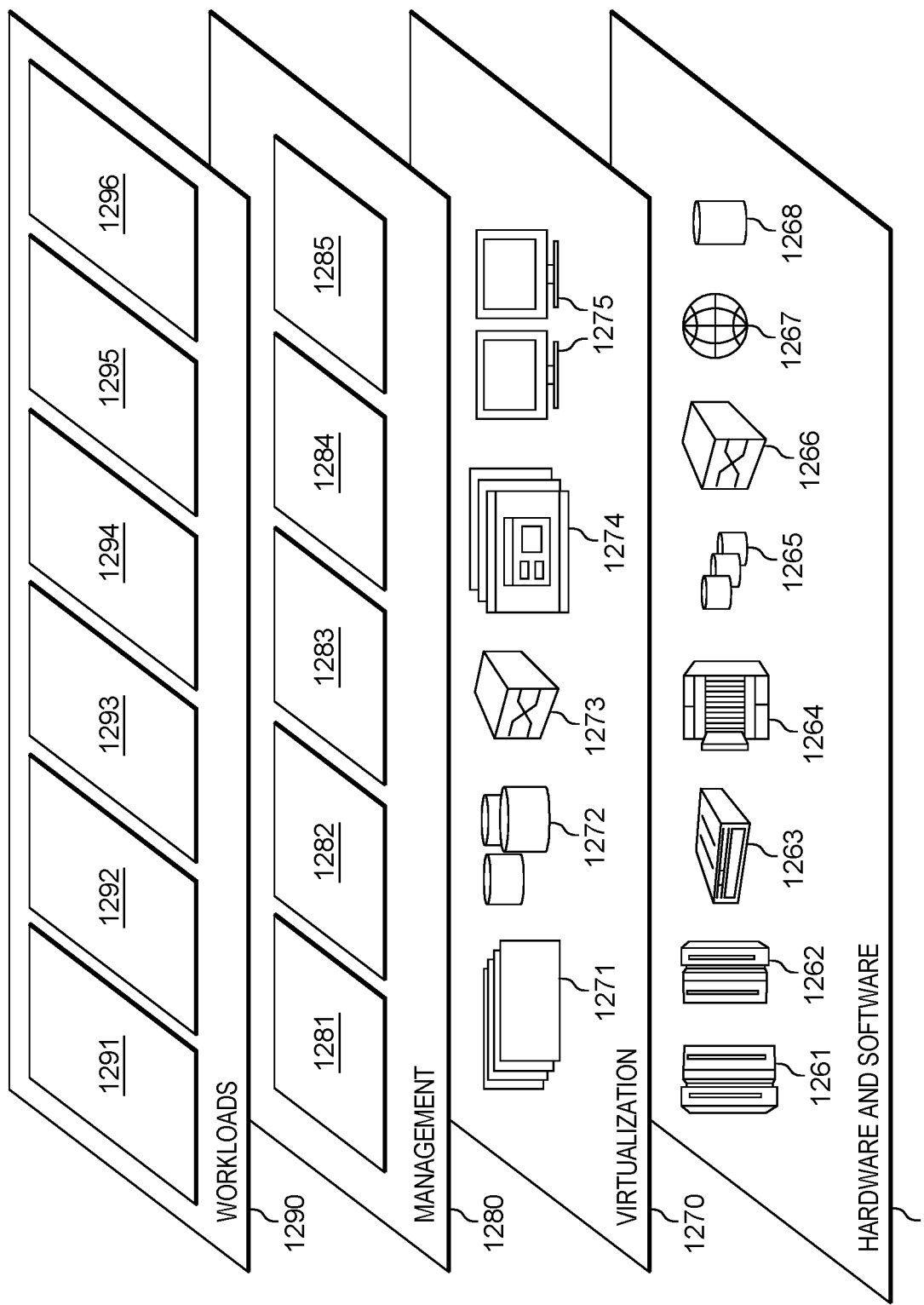
FIG. 9 is a diagram depicting abstraction model layers provided by the cloud computing environment of FIG. 6, in accordance with an embodiment of the invention.

The messaging devices and the server may include internal and external hardware components, as described in further detail below with respect to FIG. 7. It should be appreciated that FIG. 7 provides only an illustration of one implementation and does not imply any limitations with regard to the environments in which different embodiments may be implemented. Many modifications to the depicted environment may be made. In other embodiments, the messaging devices and the server may operate in a cloud computing environment, as depicted in FIGS. 8 and 9.

Referring to FIG. 7, a system 1000 includes a computer system or computer shown in the form of a generic computing device. The method of the present invention, for example, may be embodied in a program(s) 1060 (FIG. 7) embodied on a computer readable storage device, for example, generally referred to as memory 1030 and more specifically, computer readable storage medium 1050 as shown in FIG. 6. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database which can include data 1114. The computer system 1010 and the program 1060 shown in FIG. 7 are generic representations of a computer and program that may be local to a user, or provided as a remote service (for example, as a cloud-based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 7 as program modules 1064. The program 1060 and program modules 1064 can execute specific steps, routines, sub-routines, instructions, or code, of the program.

Embodiments of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 7, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as removable and non-removable media. Computer memory 1030 can include additional computer readable media 1034 in the form of volatile memory, such as random-access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method of the present invention, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The program 1060 may be the keyword system or the natural language processing system. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., cell phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 8 are intended to be illustrative only and that computing nodes 1210 and cloud computing environment 1250 can communicate with any type of computerized device over any type of network and/or network addressable connection (e.g., using a web browser).

Referring now to FIG. 9, a set of functional abstraction layers provided by cloud computing environment 1250 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1260 includes hardware and software components. Examples of hardware components include mainframes 1261; RISC (Reduced Instruction Set Computer) architecture-based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include mapping and navigation 1291; software development and lifecycle management 1292; virtual classroom education delivery 1293; data analytics processing 1294; transaction processing 1295; and assessing conditions and recommending modifications 1296.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for suppressing message notifications, the method comprising:
receiving a message, with a message device, from a server, wherein the message device and at least one other nearby message device belong to a shared chat group, wherein the shared chat group is associated with a group chat name;
determining that the at least one other nearby message device has received and emitted a notification associated with the message, comprising:
comparing the group chat name and a message ID associated with the message with an entry in a local cache in the message device, wherein the entry in the local cache corresponds with the received message; and
responsive to determining that the at least one other nearby message device has received and emitted the notification associated with the message, suppressing a notification associated with the message device; and
responsive to a non-entry in the local cache in the message device, transmitting, by one or more computer processors, a data packet to each of the at least one other nearby device.

2. The computer-implemented method of claim 1, wherein the at least one other nearby device is identified by analyzing message devices within a pre-defined proximity of the message device.

3. The computer-implemented method of claim 1, wherein the at least one other nearby device is identified by a device location method associated with the message device.

4. The computer-implemented method of claim 1, wherein determining that the at least one other nearby message device has received and emitted the notification associated with the message comprises comparing, by one or more computer processors, a unique identifier of the message to the local cache in the message device.

5. The computer-implemented method of claim 1, further comprising:
responsive to determining that the at least one other nearby message device has not received and emitted the notification associated with the message, emitting, by one or more computer processors, the notification, wherein emitting the notification is dependent upon a notification setting associated with the message device.

6. The computer-implemented method of claim 5, further comprising:
transmitting, by one or more computer processors, the data packet to the at least one other nearby message device, wherein the data packet comprises a group chat ID and a message ID which are stored in the local cache of the at least one other nearby message device.

7. The computer-implemented method of claim 6, wherein the data packet further comprises a message device ID, an order that the message device received the message, and the notification settings of said message device.

8. The computer-implemented method of claim 1, further comprising:
transmitting, by one or more computer processors, the data packet to the at least one other nearby message device, wherein the at least one other nearby message device is any proximate device, relative to the message device, capable of receiving the data packet, and wherein the data packet comprises a group chat ID and a message ID.

9. The computer-implemented method of claim 8, further comprising:
analyzing, by one or more computer processors, with the at least one other nearby message device, the data packet to determine whether the at least one other nearby message device and the message device belong to the same chat group and responsive to determining that the at least one other nearby message device and the message device belong to the same group chat, storing the data packet into a local cache of the nearby message device.

10. The computer-implemented method of claim 6, wherein the data packet is transmitted via User Datagram Protocol (UDP).

11. The computer-implemented method of claim 1, wherein the message device and the at least one other nearby message device belong to different users.

12. The computer-implemented method of claim 1, wherein the message device and the at least one other nearby message device belongs to a same user.

13. A computer program product for suppressing message notifications, the computer program product comprising:
one or more computer readable storage media and program instructions stored on the one or more computer readable storage media, the stored program instructions comprising:
program instructions to receive, with a message device, a message from a server, wherein the message device and at least one other nearby message device belong to a shared chat group, wherein the shared chat group is associated with a group chat name;
program instructions to determine that the at least one other nearby message device has received and emitted a notification associated with the message, comprising:
program instructions to compare the group chat name and a message ID associated with the message with an entry in a local cache in the message device, wherein the entry in the local cache corresponds with the received message; and
program instructions to suppress a notification associated with the message device, responsive to determining that the at least one other nearby message device has received and emitted the notification associated with the message; and
program instructions to transmit a data packet to each other nearby device, responsive to a non-entry in the local cache in the message device.

14. The computer program product of claim 13, wherein the at least one other nearby device is identified by analyzing message devices within a pre-defined proximity of the message device.

15. The computer program product of claim 13, wherein the at least one other nearby device is identified by a device location method associated with the message device.

16. The computer program product of claim 15, wherein the program instructions to determine that the at least one other nearby message device has received and emitted the notification associated with the message is processed by comparing a unique identifier of the message to the local cache in the message device.

17. The computer program product of claim 13, wherein the program instructions stored, on the one or more computer readable storage media, further comprise:
program instructions to emit the notification with the message device, responsive to determining that the at least one other nearby message device has not received and emitted a notification associated with the message, wherein the emitting the notification is dependent upon a notification setting associated with the message device.

18. The computer program product of claim 17, wherein the program instructions stored, on the one or more computer readable storage media, further comprise:
program instructions to transmit the data packet to the at least one other nearby message device, wherein the data packet comprises a group chat ID and a message ID.

19. The computer program product of claim 18, wherein the data packet further comprises a message device ID, the order that the message device received the message, and the notification settings of said message device.

20. A computer system for suppressing message notifications comprising: one or more computer processors;
one or more computer readable storage media; and
program instructions stored on the computer readable storage media for execution by at least one of the one or more processors, the stored program instructions comprising:
program instructions to receive, with a message device, a message from a server, wherein the message device and at least one other nearby message device belong to a shared chat group, wherein the shared chat group is associated with a group chat name;
program instructions to determine that the at least one other nearby message device has received and emitted a notification associated with the message, comprising:
program instructions to compare the group chat name and a message ID associated with the message with an entry in a local cache in the message device, wherein the entry in the local cache corresponds with the received message; and
program instructions to suppress a notification associated with the message device, responsive to determining that the at least one other nearby message device has received and emitted the notification associated with the message; and
program instructions to transmit a data packet to each other nearby device, responsive to a non-entry in the local cache in the message device.

* * * * *